United States Patent [19]
Casey

[11] Patent Number: 5,450,677
[45] Date of Patent: Sep. 19, 1995

[54] APPARATUS FOR USE IN MARKING A PIPE

[76] Inventor: Gordon C. Casey, 3011 S. 90th East Ave., Tulsa, Okla. 74129

[21] Appl. No.: 223,645

[22] Filed: Apr. 6, 1994

[51] Int. Cl.6 .................................................. G01B 3/00
[52] U.S. Cl. ........................................ 33/529; 33/562; 33/373
[58] Field of Search .......................... 33/529, 370-373, 33/354, 562, 563

[56] References Cited

U.S. PATENT DOCUMENTS

| | | |
|---|---|---|
| D. 319,794 | 9/1991 | Elkins . |
| 1,610,193 | 12/1926 | Battle . |
| 1,683,953 | 9/1928 | Carr ................................. 33/529 |
| 2,155,705 | 4/1939 | Gottwald ....................... 33/563 X |
| 2,533,500 | 12/1950 | Parsons . |
| 2,756,512 | 7/1956 | Pettit ................................ 33/372 |
| 3,128,560 | 4/1964 | McKenzie ....................... 33/529 |
| 3,209,459 | 10/1965 | Fish . |
| 4,338,725 | 7/1982 | Martin et al. . |
| 4,653,195 | 3/1987 | Esparza ............................ 33/529 |
| 4,785,544 | 11/1988 | Heinsius et al. ............... 33/372 X |

FOREIGN PATENT DOCUMENTS 114510  4/1926  Switzerland ........................ 33/372

Primary Examiner—Alvin Wirthlin
Attorney, Agent, or Firm—Head and Johnson

[57] ABSTRACT

An apparatus for use in marking a length of cylindrical pipe to permit the pipe to be cut for use in an assembly and arranged so that a plurality of markings on a length of pipe can be accurately oriented relative to each other. The device has a tubular plastic sleeve that is split in a plane of the sleeve longitudinal axis, the sleeve being flexible so as to permit the sleeve to be expanded over and subsequently to conform to the external surface of a pipe. The sleeve has at least one end with a configuration of a desired marking. A bubble level is affixed to the exterior surface of the sleeve so that when the sleeve is used to make more than one marking on a length of pipe, the markings can be axially oriented with respect to each other.

6 Claims, 2 Drawing Sheets

APPARATUS FOR USE IN MARKING A PIPE

CROSS-REFERENCE TO RELATED APPLICATIONS

This application is not related to any pending United States or foreign patent applications.

CROSS-REFERENCE TO MICROFICHE APPENDIX

This application is not related to any microfiche appendix.

BACKGROUND OF THE INVENTION

Cylindrical pipe is frequently used for the manufacture of a large variety of products. Cylindrical pipe is useful for manufacturing structural devices because of its ready availability, its economy, and its high-structural strength. When using a length of pipe to make an object wherein lengths are to be welded or otherwise joined together, a common experience is to mark the pipe where it is to be cut utilizing a heavy pencil, chalk or marking stone. By use of a cutting torch, the pipe can then be cut where it is marked. For instance, if a rectangular shape is to be formed out of a length of pipe, then eight angular cuts must be formed on four lengths of pipe so that they can be welded together.

A problem exists in cutting a length of pipe in that the relationship between the angle at one end must coincide with that at the other end. For instance, if a 45° angle is to be cut at each end of a length of pipe, the angles must have the same orientation with each other relative to the pipe, otherwise, a structure made by welding the lengths of pipe together would not be uniform.

For these reasons, a common means of marking a length of pipe is by a template that fits around the pipe. An example of a template of this type is shown in U.S. Pat. No. Des. 319,794. Other template designs can be found in U.S. Pat. Nos. 3,209,459; 1,610,193; 2,533,550 and 4,338,725. These patents are incorporated herein by reference.

The present invention is an apparatus for use in marking a cylindrical pipe that has advantages of economy of construction, ease of use, and accuracy of alignment that is not available with the marking templates as revealed in these previously issued patents.

BRIEF SUMMARY OF THE INVENTION

An apparatus for use in marking a cylindrical pipe of this invention is in the form of a tubular sleeve member that has a tubular axis and an internal diameter that is substantially equal to the external diameter of the pipe to be marked. The sleeve has a split therein, the split being in a sidewall of the tubular sleeve and in a plane that incorporates the sleeve tubular axis.

The tubular sleeve is preferably formed of a plastic that is sufficiently flexible to expand over a pipe to be marked. This is achieved by widening the sleeve by spreading apart the area having the split therein so that the sleeve then snaps over a cylindrical pipe. The plastic material of which the sleeve is preferably made must have sufficient flexibility and memory so that after the sleeve has been snapped over a length of pipe it will return to its normal state wherein it will substantially conform to the exterior surface of the pipe.

The tubular sleeve member has opposed ends. Each of the ends is shaped to a configuration of a desired marking. For instance, typically one end will be shaped to provide a marking of a plane of the tubular pipe that extends at an angle of 45° to the pipe tubular axis. The other end of the sleeve may be configured in opposed semi-circles so that the pipe when cut using such a pattern will fit against the exterior sidewall of another pipe of the same or substantially the same diameter, with the pipe that has been cut extending perpendicular to the other pipe. These are merely two examples of patterns that can be provided on the opposed ends of the sleeve.

A bubble level is affixed to the exterior surface of the sleeve at a location spaced from the split and spaced between the opposed ends. The bubble level has a longitudinal axis and the level is secured to the sleeve so that the longitudinal axis is normal to a plane drawn through the sleeve tubular axis. The bubble level provides means for coordinating the orientation of a plurality of markings on a single length of pipe.

In a preferred arrangement, the bubble level is supported by a member having opposed upwardly extending legs. The support member is preferably formed of foam plastic. The bubble level is secured between these upper extending legs and is thus spaced above or outwardly of the surface of the sleeve member.

A foam rubber support element does not interfere when the sleeve is expanded to fit over a length of pipe. Further, the sleeve can return to its normal configuration while it is on a length of pipe without disturbing the bubble level.

A more complete understanding of the invention will be obtained from the following Detailed Description, taken in conjunction with the attached drawings.

DETAILED DESCRIPTION

Figure 1:
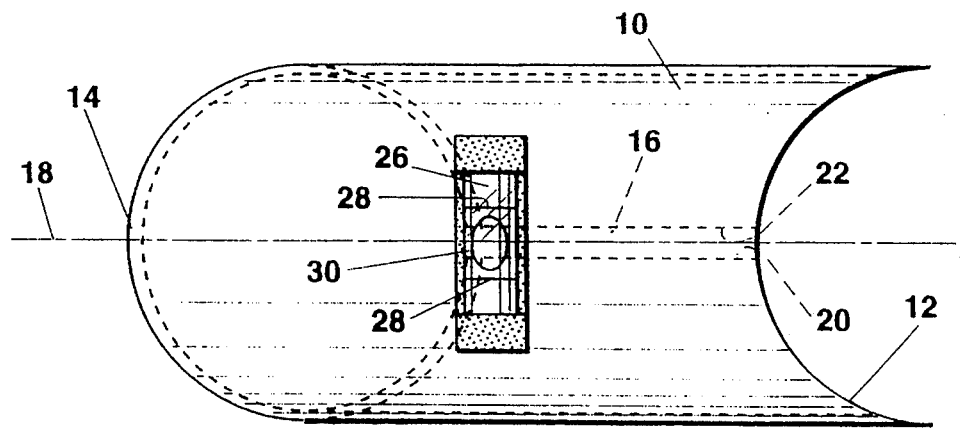
FIG. 1 is a top plan view of an apparatus for use in marking a pipe according to this invention.
Figure 2:
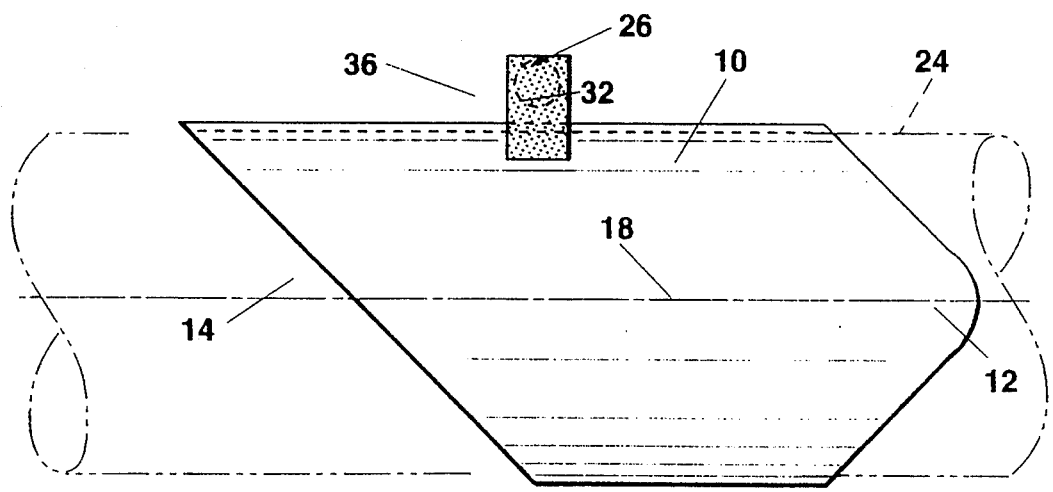
FIG. 2 is an elevational side view of the apparatus of FIG. 1 but showing the apparatus as positioned on a length of pipe, the pipe being shown in dotted outline.
Figure 3:
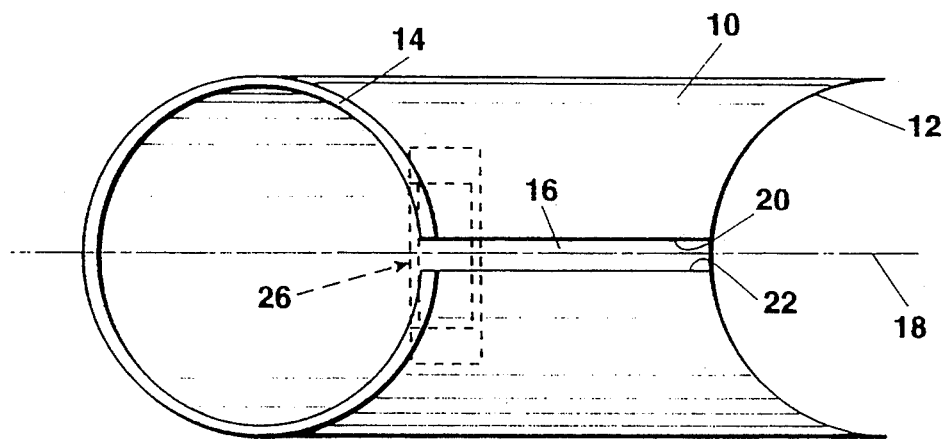
FIG. 3 is a bottom plan view of the apparatus for marking a pipe as shown in FIGS. 1 and 2.

Referring to FIGS. 1, 2 and 3, an apparatus for use in marking a pipe that incorporates the principles of the invention is illustrated. The apparatus is formed of a sleeve 10 that has a cylindrical sidewall, a first end 12 and a second end 14. Sleeve 10 is preferably formed of thin relatively strong but slightly flexible plastic such as polyethylene. Sleeve 10 has split 16 formed in the tubular wall, the split being formed in a plane that includes the sleeve longitudinal tubular axis 18. Split 16 forms opposed edges 20 and 22 that may, in the sleeves normal shape, be slightly spaced apart from each other or, if the sleeve 10 is formed of material having good memory, edges 20 and 22 may normally contact each other.

The ends 12 and 14 of sleeve 10 are configured to provide a typical template or marking edge. For instance, first end 12 is cut into two opposed semi-circular shapes. When a marking is made at end 12 and subsequently the pipe is cut along this marking, the end of the pipe will then be configured to be joined perpendicularly to another length of pipe so that the cut pipe extends at right angles to the second pipe. Second end 14, as illustrated in FIGS. 1, 2, and 3, is cut in a plane that is at an angle of 45° with respect to the sleeve longitudinal axis 18. FIG. 2 shows a sleeve as positioned on a length of pipe 24, the pipe being shown in dotted outline. After a marking is made at second end 14 the pipe can be cut along this marking. A configuration is formed at the end of the pipe that can be abutted against a similar cut end of a second length of pipe so that the pipes are then attachable to each other in a right angle (90°) relationship. The specific configuration of ends 12 and 14 depend upon the need of the user. Each configuration can vary considerably. For instance, instead of the second end 14 being in a plane taken 45° to the sleeve longitudinal axis 18, this end of the sleeve could be configured in a plane that is perpendicular to longitudinal axis 18. This would provide a marking edge that would produce, after cutting, a planar end, such as if the pipe is to be welded to a flat surface.

When a marking is to be made in two places on a length of pipe, it is usually important that the markings be oriented with respect to each other. For instance, if a length of pipe is to be marked with two markings, as shown on the second end 14 of the sleeve, so that the length of pipe can be utilized with three other equal lengths to be welded together to form a square, it is important that the first marking is oriented with respect to a second marking. For this purpose, a bubble level 26 is secured to the external surface of sleeve 10 at a point spaced from split 16 and spaced intermediate the opposed ends 12 and 14. The bubble level is of the usual type, that is, it is in the form of a glass or plastic tube having a liquid therein with a bubble in the liquid so that the bubble can move in response to the pivotation of the level. The bubble level has markings 28 thereon so that bubble 30, when positioned between markings 28, indicates a precise orientation with respect to the earth as it is rotatably positioned around its tubular axis 18.

Figure 4:
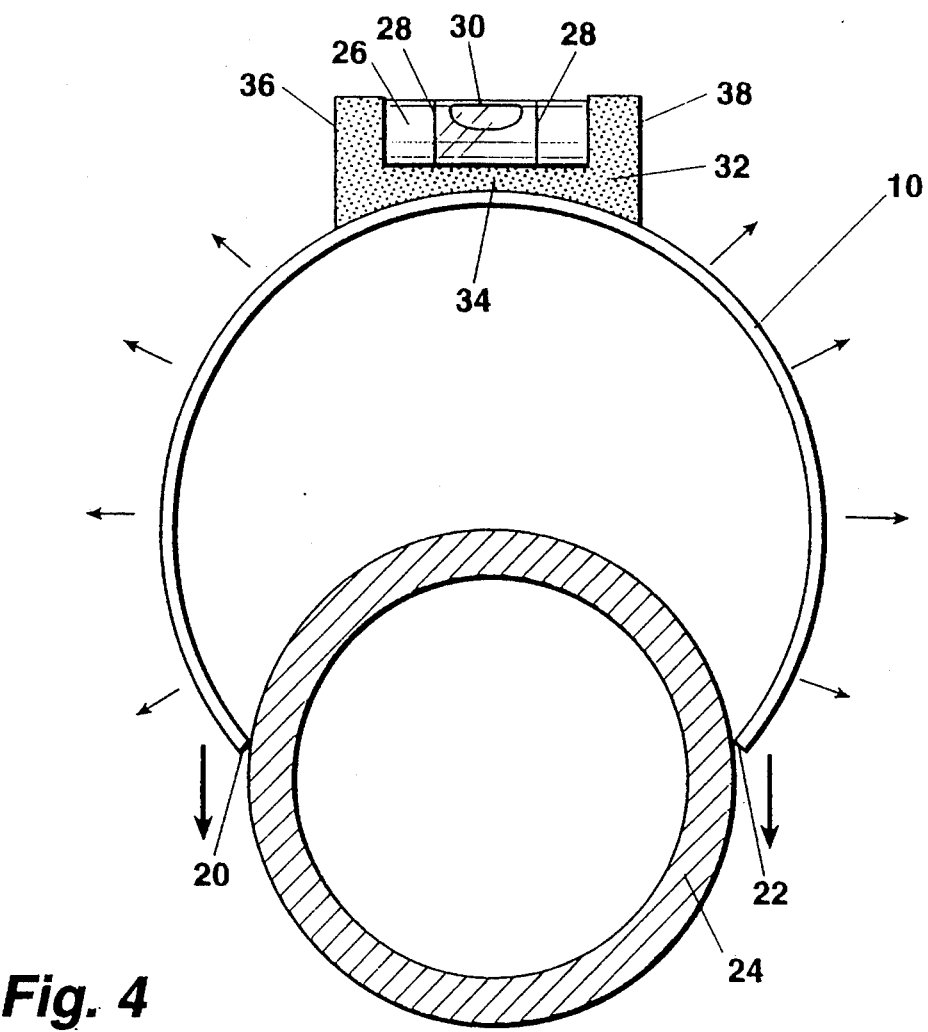
FIG. 4 is an end view of the tubular sleeve member as it appears when the member is being inserted on a length of pipe, the pipe being shown in cross-section.

The bubble level 26 is attached to sleeve 10 by means of a support 32, as best seen in FIGS. 1, 2 and 4. Support 32 includes a base portion 34 that is bonded or otherwise secured by adhesive to the external surface of sleeve 10. Base portion 34 has opposed upstanding end portions 36 and 38 with the bubble level 26 being supported, such as by adhesive, between end portions 36 and 38.

While support 32 can be formed of a rigid material, a preferred embodiment includes the arrangement wherein the support is made of foam plastic, that is soft, highly flexible plastic.

Figure 5:
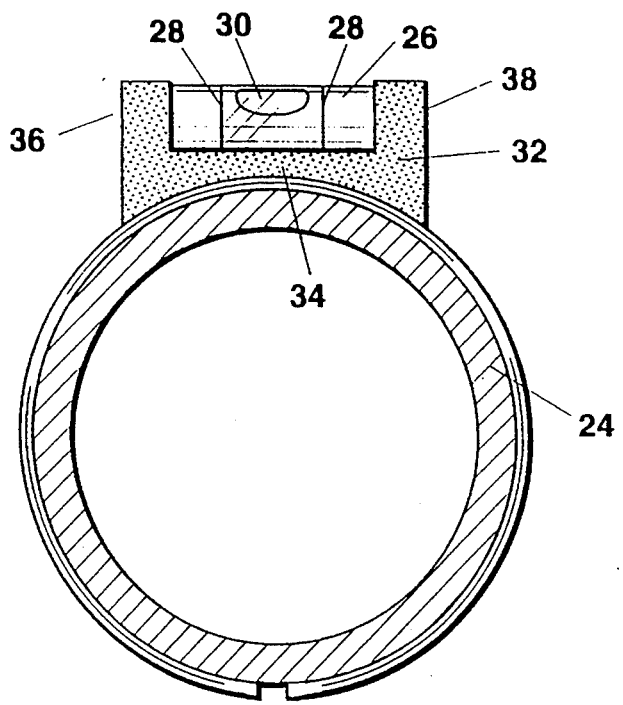
FIG. 5 is an end view of the apparatus as shown in FIGS. 1–3 but showing the apparatus as closed upon a pipe ready for use in marking the pipe.

FIGS. 4 and 5 show a method of using the apparatus for marking a pipe. Pipe 24 is shown in cross-section. Sleeve 10 can be installed on pipe 24 in two ways. One is to slide the sleeve over the end of a pipe. However, a more convenient way is to expand the edges 20 and 22 by spreading the sleeve apart in the direction shown by the radially extending arrows. When edges 20 and 22 are spread apart equal to the diameter of pipe 24, the sleeve can be positioned on the pipe by moving it downwardly in the direction indicated by the downward, heavier arrows in FIG. 4.

As the sleeve is positioned on a pipe, the normal memory of the plastic material of which the sleeve is made causes it to return to, or vary close to, its original shape to conform about pipe 24. When in position around the pipe, as shown in FIGS. 2 and 5, either end 12 or 14 can be marked while maintaining the sleeve oriented so that bubble 30 is between markings 28. If the pipe is then retained in the same relative rotational position with respect to the earth, that is, the pipe is not rotationally moved, sleeve 10 can be taken off of the pipe and placed at another position on the pipe, and with bubble 30 between markings 28, a second marking can be made on the pipe with the assurance that the second marking will be accurately oriented with respect to the first.

This pipe marking apparatus of this invention has the advantage of extremely lightweight, economy of construction, and ease of use. This device does not have any moving parts or any portions to wear out or become misaligned.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. Apparatus for use in marking a cylindrical pipe to permit the pipe to be cut for use in an assembly comprising:

a unitary tubular sleeve member having a tubular axis and an internal diameter that is substantially equal to the external diameter of cylindrical pipe on which the apparatus is to be used, the tubular sleeve being formed of thin, flexible plastic having a split therein permitting the sleeve member to be flexibly expanded over and to fit against a pipe to be marked, the tubular sleeve member having opposed first and second ends, at least one end having configuration means for permitting a desired circumferential marking; and a bubble level affixed to an exterior surface of said sleeve member at a location spaced from said split, the bubble level having a longitudinal axis, the level being positioned so that its longitudinal axis is normal to a plane of said tubular sleeve longitudinal axis, the bubble level providing means for coordinating the orientation of a plurality of markings on a single length of pipe.

2. Apparatus for marking a pipe according to claim 1 including:

a bubble level support having a base portion and support portions, said base portion being affixed to said sleeve member and said bubble level being affixed between said support portions, said bubble level support being formed of flexible material.

3. Apparatus for marking a pipe according to claim 2 wherein said bubble level support is made of foam plastics.

4. Apparatus for use in marking a cylindrical pipe to permit the pipe to be cut for use in an assembly comprising:

a unitary tubular sleeve member having substantially uniform and concentric interior and exterior circumferential surfaces, having a tubular axis and having an internal diameter substantially equal to that of a cylindrical pipe to be marked, the tubular sleeve member being formed of flexible material having a split therein permitting the tubular sleeve member to be flexibly expanded over and to fit against a pipe to be marked, the tubular sleeve member having opposed ends, at least one of which has configuration means for permitting a desired circumferential marking; and a level affixed to said exterior surface of said tubular member, the level having means to indicate the rotational position of said tubular member about its said tubular axis relative to the horizontal, the level providing means for coordinating the orientation of a plurality of markings on a single length of pipe.

5. Apparatus for marking pipe according to claim 4 wherein said tubular member includes means of radial expansion whereby said tubular member may be affixed onto a pipe to be marked while maintaining said tubular member longitudinal axis paralleled to the cylindrical pipe to be marked.

6. Apparatus for marking pipe according to claim 4 wherein said level has a longitudinal axis, said level being affixed to said tubular member with said level longitudinal axis normal to a plane of said tubular member tubular axis.

* * * * *